United States Patent
Becker et al.

(10) Patent No.: US 7,568,027 B2
(45) Date of Patent: *Jul. 28, 2009

(54) EVENT SUPPRESSION TOOL FOR TEMPORARILY SUPPRESSING ACTIONS ON RECEIVED EVENTS

(75) Inventors: Kenneth M. Becker, Brandon, FL (US); Rhonda L. Childress, Austin, TX (US); Brent W. Lamm, Bailey, NC (US); Thomas L. Newton, Cumming, GA (US); Michael B. Oliver, Chapin, SC (US); Ravirajan Rajan, Apex, NC (US); Sara H. Waggoner, Bradenton, FL (US)

(73) Assignee: International Business Machines Corporation, Armonk, NY (US)

( * ) Notice: Subject to any disclaimer, the term of this patent is extended or adjusted under 35 U.S.C. 154(b) by 988 days.

This patent is subject to a terminal disclaimer.

(21) Appl. No.: 10/890,797

(22) Filed: Jul. 13, 2004

(65) Prior Publication Data

US 2006/0015608 A1    Jan. 19, 2006

(51) Int. Cl.
G06F 15/173   (2006.01)
G06F 17/00    (2006.01)
G06F 13/00    (2006.01)

(52) U.S. Cl. .................... 709/224; 719/318; 706/47

(58) Field of Classification Search ............... None
See application file for complete search history.

(56) References Cited

U.S. PATENT DOCUMENTS

| 5,500,938 | A  | * | 3/1996  | Cahill et al. ............... 715/856 |
| 6,490,574 | B1 | * | 12/2002 | Bennett et al. ............. 706/47  |
| 6,564,171 | B1 |   | 5/2003  | Peterson et al.                     |
| 6,735,293 | B2 | * | 5/2004  | Doherty et al. ......... 379/201.12  |
| 6,845,503 | B1 | * | 1/2005  | Carlson et al. ............... 717/166 |
| 2002/0120621 | A1 | * | 8/2002  | Fisher ............................ 707/3 |
| 2002/0163427 | A1 |   | 11/2002 | Eryurek et al.                     |
| 2003/0212789 | A1 | * | 11/2003 | Hamel et al. ................ 709/225 |
| 2003/0219018 | A1 |   | 11/2003 | Van Der Burg et al.                |

OTHER PUBLICATIONS

Becker, et al., "Alert Control Tool Low Level Design", *e-Technology Center*, IBM Global Services, Version 1.2k, pp. 1-99; Oct. 25, 2002.
Becker, "GSNMA Event Flows in TEC", *e-business Hosting System and Network Management Tools*, IBM—Version 1.3.5, May 12, 2003.
Ulrich, "Event Manipulation for Discrete Simulations Requiring Large Numbers of Events", Digital Equipment Corporation, Communications of the ACM, vol. 21, No. 9, Sep. 1978, pp. 777-785.

* cited by examiner

*Primary Examiner*—Wen-Tai Lin
(74) *Attorney, Agent, or Firm*—Scully, Scott, Murphy & Presser, P.C.; John R. Pivnichny

(57) ABSTRACT

Disclosed are a tool, a method, and a computer program for suppressing events. The tool comprises a database having a resource table, a batch loader interface for creating or updating said resource table, and a web based user interface to said database. The event suppression tool further comprises a batch interface to receive data about planned activities and affected resources; and code for creating suppression activity windows from said data and said resource table, and for suppressing from said user interface, new events that fall within said activity windows. The preferred embodiment of the invention allows temporarily suppressing various actions for events received for certain resources during specified times.

19 Claims, 9 Drawing Sheets

AUTO SEND PROCESS

FILE MOVER PROCESS

CHANGE_START EVENT FLOW

CHANGE_STOP EVENT FLOW

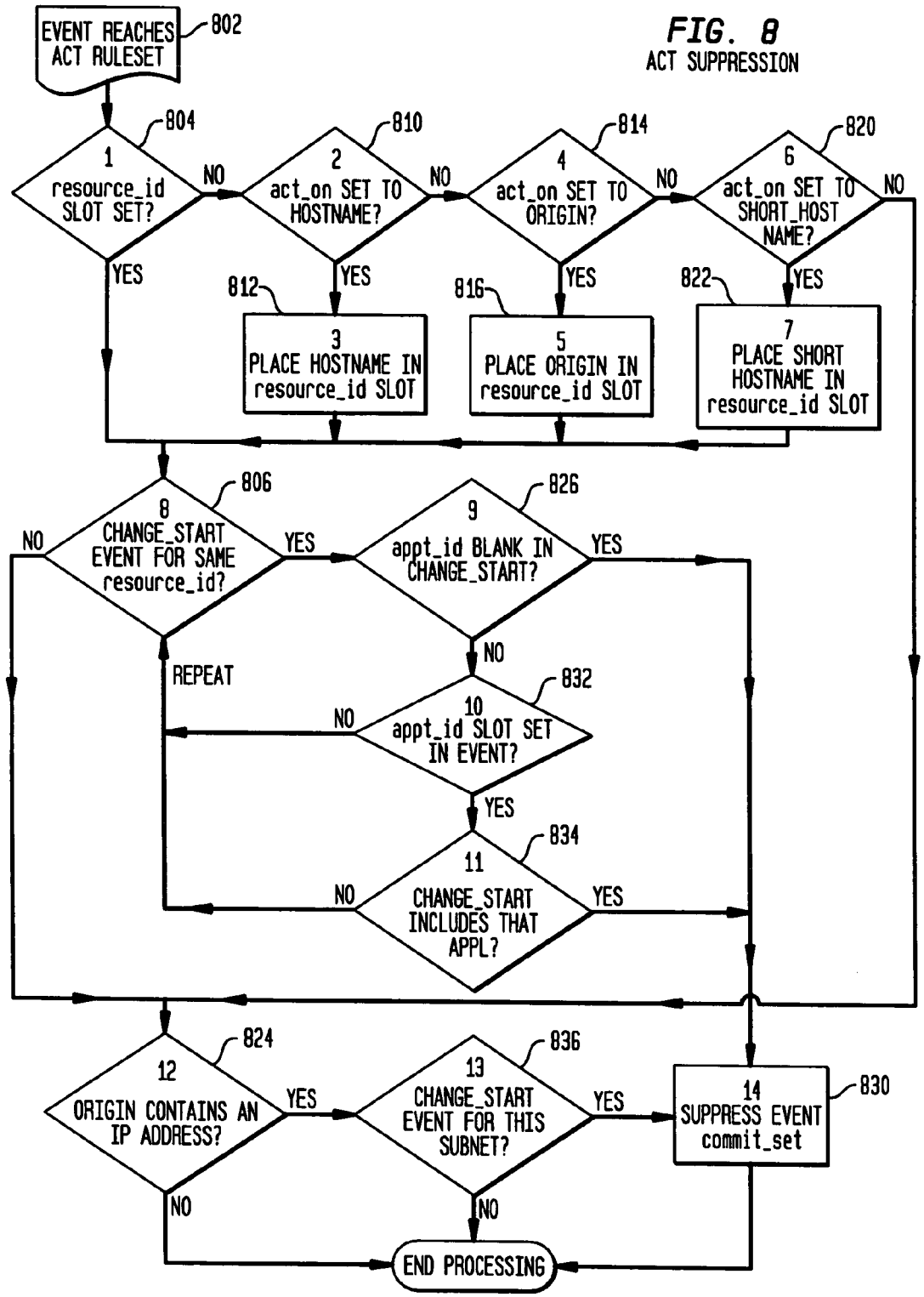

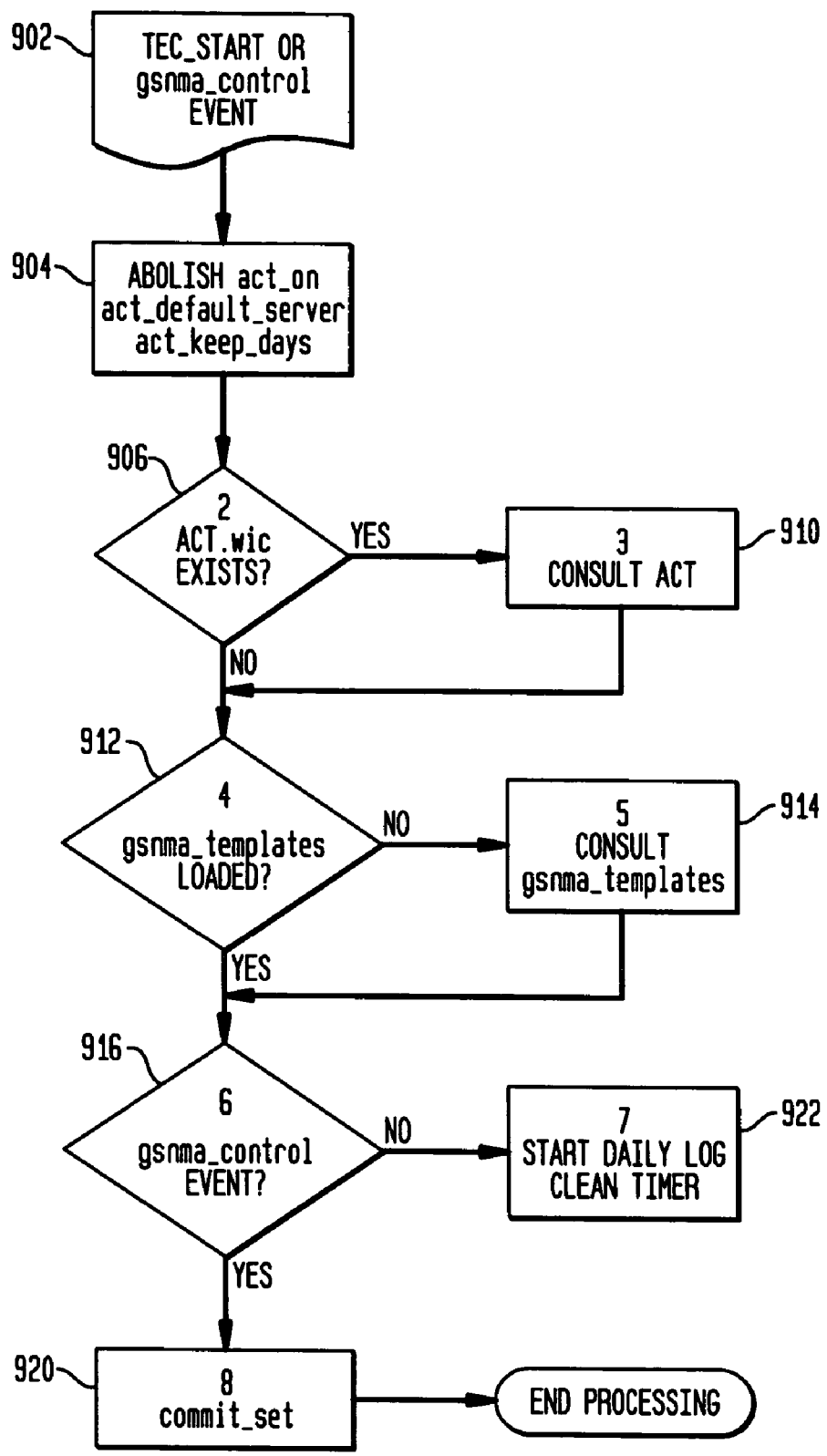

EVENT SUPPRESSION TOOL FOR TEMPORARILY SUPPRESSING ACTIONS ON RECEIVED EVENTS

BACKGROUND OF THE INVENTION

1. Field of the Invention

This invention generally relates to resource management, and more specifically, the invention relates to an event suppression tool. Even more specifically, the invention relates to a tool that allows temporarily suppressing actions for events received for certain resources during specified times.

2. Background Art

When out of target situations arise (e.g. file system full, server down) on resources that are being managed, monitoring functions generate events which are sent to the event management system. The events contain information about the situation and the affected resource. The event management system is responsible for driving the necessary actions required to correct the situation.

The actions that the event management system can take fall into five areas: display the event to an operator monitoring an event management console, generate a problem ticket for the event, notify someone of the situation, drive an automated recovery action, and forward the event to another event management system.

There are times when events from certain resources do not require the standard actions. This may be due to the business status of the resource (for example, resource not yet in production) or due to change activity. In these cases, it is desirable to suppress the standard actions in order to save resources and not interfere with the activity that is taking place on the resource. For example, when a scheduled change takes place on a resource that includes taking down an application while a patch is being installed, it is undesirable for the Event Management system to try to restart that application or to notify operations to take action to recover it.

SUMMARY OF THE INVENTION

An object of this invention is to provide an improved event suppression tool.

Another object of the present invention is to allow temporarily suppressing various actions for events received by an event management system for certain resources during specified times.

These and other objectives are attained with an event suppression tool, comprising a database having a resource table, a batch loader interface for creating or updating said resource table, and a web based user interface to said database. The event suppression tool further comprises a batch interface to receive data about planned activities and affected resources; and code for creating suppression activity windows from said data and said resource table, and for suppressing from said user interface, new events that fall within said activity windows.

The preferred embodiment of the invention, described below in detail, is referred to as the Alert Control Tool (ACT), and this tool may be implemented using the Tivoli Enterprise Consol (TEC) event management system provided by the International Business Machines Corporation. The ACT allows temporarily suppressing various actions for events received by the TEC for certain resources during specified times.

ACT encompasses a WEB front end, a database, the TEC backend and the linkages between configuration and change management systems and the database.

When ACT is suppressing actions for a resource, the resource is in an ACT "suppression window" or "window". Even though multiple actions are being suppressed, the suppression may be referred to as alert suppression or event suppression rather than action suppression.

These windows can be created for a resource or subnet for any number of reasons. Three common examples are:
to suppress actions when the resource is undergoing change
to suppress actions when the resource is not yet in production
to suppress actions when the resource has been removed from production but monitoring has not yet been removed.

The base function of the Alert Control Tool (ACT) is to suppress TEC automated actions for events received for resources while they are in suppression windows. The ACT server does this by sending suppression start and stop events to the TEC at the start and end of each window. Among other things, the events identify the window, affected resource or subnet and the ACT server making the request. The ACT rules on the TEC actually handle the suppression of the actions. When a window stop event is processed, the TEC rules stop suppressing actions and also record the events that were received during the suppression to a log where the ACT server can retrieve them as needed.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 8 is a flow chart of the processing when an event reaches an ACT ruleset.

FIG. 9 shows an ACT initialization procedure.

DETAILED DESCRIPTION OF THE PREFERRED EMBODIMENTS

Figure 1:
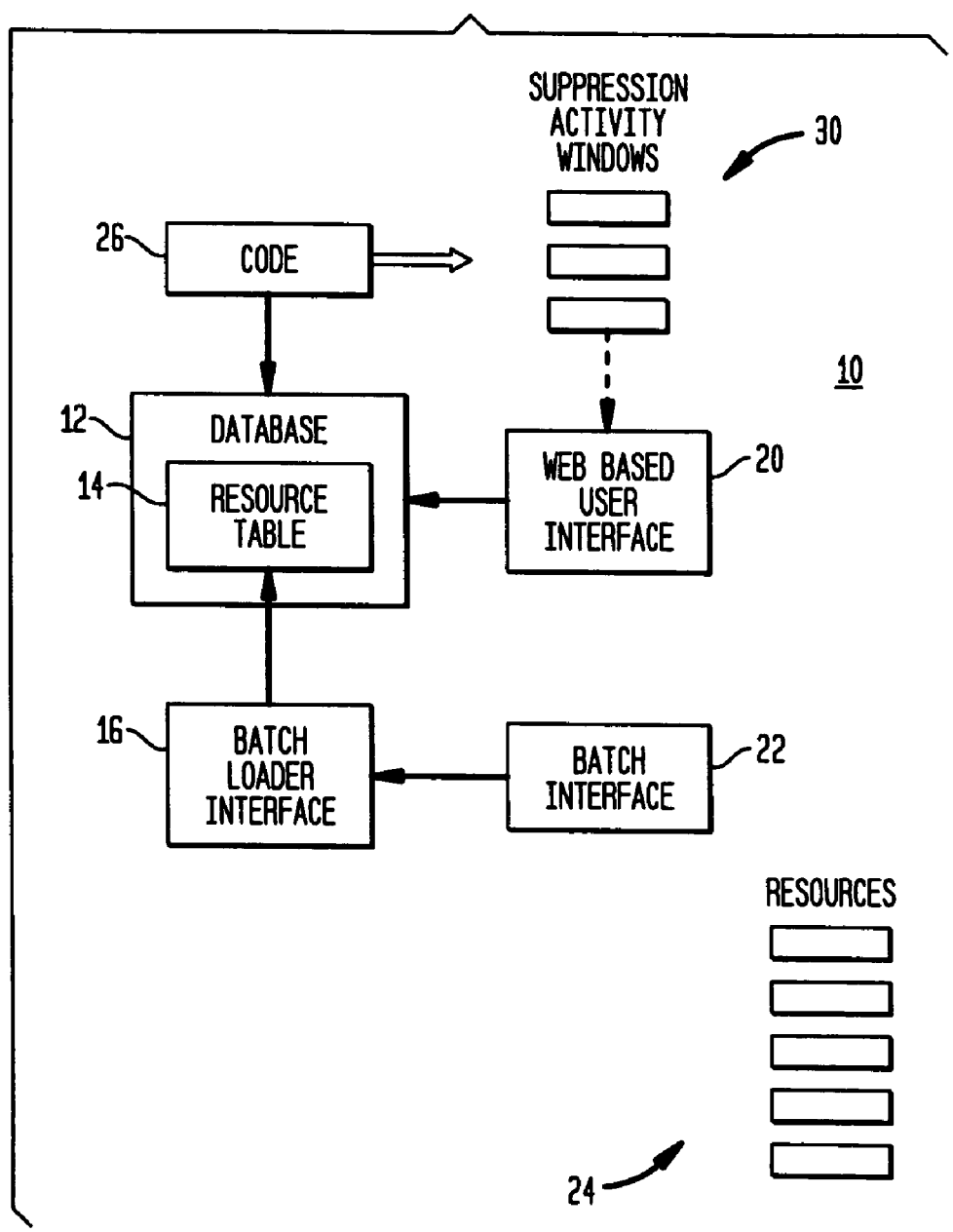
FIG. 1 is a simplified block diagram of an event suppression tool in accordance with the present invention.

With reference to FIG. 1, the present invention, generally, relates to an event suppression tool 100, comprising a database 102 having a resource table 104, a batch loader interface 106 for creating or updating said resource table, and a web based user interface 120 to said database 102. The event suppression tool further comprises a batch interface 122 to receive data about planned activities and affected resources, represented at 124; and code 126 for creating suppression activity windows, represented at 130, from said data and said resource table 104, and for suppressing from said user interface 120, new events that fall within said activity windows.

The preferred embodiment of the invention, described below in detail, is referred to as the Alert Control Tool (ACT), and this tool may be implemented using the Tivoli Enterprise Consol (TEC) event management system provided by the International Business Machines Corporation. The ACT allows temporarily suppressing various actions for events received by the TEC for certain resources during specified times.

ACT encompasses a WEB front end, a database, the TEC backend and the linkages between configuration and change management systems and the database.

When ACT is suppressing actions for a resource, the resource is in an ACT "suppression window" or "window." Even though multiple actions are being suppressed, the suppression may be referred to as alert suppression or event suppression rather than action suppression.

These windows can be created for a resource or subnet for any number of reasons. Three common examples are:
to suppress actions when the resource is undergoing change,
to suppress actions when the resource is not yet in production, and
to suppress actions when the resource has been removed from production but monitoring has not yet been removed.

Overview

The base function of the Alert Control Tool (ACT) is to suppress TEC automated actions for events received for resources while they are in suppression windows. The ACT server does this by sending suppression start and stop events to the TEC at the start and end of each window. Among other things, the events identify the window, affected resource or subnet and the ACT server making the request. The ACT rules on the TEC actually handle the suppression of the actions. When a window stop event is processed, the TEC rules stop suppressing actions and also record the events that were received during the suppression to a log where the ACT server can retrieve them as needed.

Components, functions and features of the ACT are discussed below.

Activity Records

There are several "activities" that are performed by Service Delivery that can result in events being generated where no action is required or desirable. Some of the activities are:
scheduled changes,
setting up new resources for the production environment (transition), and removing resources from production (disco).

When one of these activities is going to take place, an activity record is added in ACT. The activity record contains:
the type of activity (Change, Transition, Disco, Planned Outage),
a user identifier for the activity such as the change number for a change activity, the organization, which can be any logical organization such as a business unit, delivery center, branch office, etc., the activity is for,
planned start and end date and time when controlled at the activity level,
the type of suppression windows (standard or tolerance) to be used for the activity, the implementor,
notes about the activity,
activity impact (critical, major, medium or minor),
user-defined attribute (for additional classification of the activity), and
audit information (who created, updated, and when).

Window Records

Each activity will affect one or more resources or subnets. For each resource, a window record is added under the activity record. Each window record contains:
type of window, resource or subnet,
the resource id or the subnet,
for a resource window, 0 or more application Ids,
the account,
the TEC that handles the events for the resource or subnet,
a flag to indicate if the suppression start and stop requests should be sent to the TEC automatically at the scheduled start and stop times or if they have to be triggered manually,
status of the window (Planned, Start, Stop, Cancel, Archive),
actual start and stop date and time,
Planned start and stop when controlled at the window level, and
audit information (who created, updated, and when).

When a window record status is changed from Planned to Start or from Start to Stop, the ACT server sends an associated window start or stop event to the TEC for the window. It then sets the status to pending-start or pending-stop to indicate that a request is outstanding. When the TEC finishes processing the request, it sends an acknowledgment to the ACT server. When the ACT server receives the ack, it drops the pending prefix from the status to indicate that the request has been processed.

Resource Table and Records

A window can be created manually by entering all the required information about a resource or subnet on an input panel.

On the other hand, a window can be added using information contained in a resource record in the ACT resource table. Resources can be added to the resource table by authorized users via the WEB interface or via batch input from tools such as autoprovisioning tools. Each resource record in the resource table contains:
the resource id,
the account id of the customer who owns the resource,
optional list of account sub-groups the resource is in,
the SDC or Geography the resource is under,
optional site the resource is in,
the TEC that handles events for the resource,
default for auto-send of start and stop events at planned start and stop which is used when a window record is opened by a change system interface,
number of days to keep related window records before archiving,
upstream resource ID, and
audit information (who created, updated, and when).

When a user wants to add a window under an activity, they can search for resources in the resource table based on account id, account subgroup, TEC, SDC, site or resource id. They can select one or more resources from the returned list and create a window for each starting with the information taken from the resource records assuming they are authorized to create windows for those resources.

Account Table and Records

Each resource that is defined in the resource table must belong to an account. Each account that has resources defined in the resource table must be defined in the account table. Each account record contains:
the account id,
a description of the account or customer,
the organization that owns the account,
the name or names of the user groups that are authorized to administer the account (add/delete resource records or sub-groups),
the name or names of the user groups that are authorized to create or modify windows for resources owned by the account, a default for the number of days to keep completed window records for the account before archiving them,
a default for auto-send flag which is used when creating resource records under the account,
a default TEC which is used when creating resource records under the account, and
audit information (who created, updated, and when).

If a resource record is added via the batch add process, if the account does not currently exist, an account record is added automatically although not all fields will be populated.

Account Subgroup Table and Records

Each resource that is defined in the resource table may optionally be assigned to one or more subgroups defined for the account. Each account subgroup record contains:
the owning account id,
the name of the subgroup,
a description of the subgroup,
the name or names of the user groups that are authorized to create or modify windows for, resources assigned to the subgroup, and
audit information (who created, updated, and when).

Organization Table and Records

Each account and resource must be defined as belonging to a particular organization. Each organization serviced by an ACT server must be defined to the organization table. Each SDC record contains:
the organization identifier,
a description of the organization,
the name or names of the user groups that are authorized to administer organization
(add/delete account records, users for the organization, user groups, update the organization record),
the name or names of the user groups that are authorized to create or modify windows for, resources owned by the organization (including resources owned by accounts that are owned by the organization),
the name or names of the user groups that are authorized to create or modify windows for subnets under the organization,
a default for the number of days to keep completed window records which is used when creating account records under the organization,
a default for auto-send flag which is used when creating account records under the organization,
a default TEC which is used when creating account records under the organization, and audit information (who created, updated, and when).

User Table and Records

Any authorized user with the appropriate userid and password will be able to access the ACT server in read mode. Each user who will make updates to the ACT system must also be defined in the user table and be a member of a user group which has been given the authority to make the requested update. Information stored for each user is:
Type of user (system or individual),
the organization the user is in,
the user's name and email address,
the user's time zone,
additional description (optional),
user group memberships (for determining authorization),
user's stored settings (like cookies), and
audit information (who created, updated, and when).

Administrators with organization authority can create and delete user records under their organization.

User Group Table and Membership Table

Authority within the ACT system is controlled by using groups of users. Each user group must be defined to the group table and membership in each group is recorded in the membership table.

Groups are defined within an organization and thus the same group name can be used by multiple organizations. A group can only be added under an organization by a user with admin rights to the organization. Each group record contains:
the group name,
group description,
the organization the group is for,
the name or names of the user groups that are authorized to add or delete users from the group,
audit information (who created, updated, and when), and
the users who are members of the group.

Tec Table and Records

Each TEC that ACT will work with must be defined in the TEC table. Only super users can add or modify TEC records. Each TEC record contains:
the TEC name,
one or more organizations that the TEC handles events for,
the IP address for the TEC,
support contact for the TEC, and
the name or names of the user groups that are authorized to create or modify windows for the subnets on this TEC.

Interfaces

ACT has four interfaces; a web based user interface, a Change System interface, a TEC interface and a batch loader.

The web-based user interface is used for all administration functions described above as well as to create and update activities and windows. It also allows a user to display lists of windows and activities as well as view suppression logs for windows that have completed. For example, it may run on an AIX server with Websphere Application Server and may be accessible via any IBM Client for eBusiness software platform using Microsoft Internet Explorer or Netscape. It may use DB2 for the database, for example.

The Change System interface is a batch interface used to receive data about planned activities and the affected resources from change systems. ACT creates activity and window records by supplementing this change system data with data from the resource record in the resource table. Windows can only be created for resources that are in the resource table and where the change system is listed as an authorized user for the resource. By default, the interface is scheduled to run once each hour. It goes out to each supported and configured change system and pulls the changes in. The scheduling can be modified as needed for different systems.

The TEC interface is an asynchronous interface used to receive and process data about ongoing alert suppression windows that originated on the TEC. Windows may originate from the TEC in a limited set of cases, such as system reboots. ACT uses the window data from the TEC to create and update activity and window records that reflect the current window status on the TEC.

The batch loader is an interface that allows for creating or updating resource records via a flat file. The flat file can be manually created by a user or it can be an automated extract from a configuration system. The loader process is scheduled to run, for example, every hour to process any batch requests in the input directory. Other processes can be used to pull delta data from different configuration systems into this directory structure.

AutoSend Feature

ACT includes an AutoSend feature that can be enabled for windows created by the Web Interface or Change System Interface. AutoSend automatically sends start and stop events to the TEC identified for the window at the parent activity's planned start and stop time. Use of AutoSend is optional.

For windows created using the Web Interface, the default AutoSend status is "Not Requested." It can be set to "Requested" and "Approved" (or reset to "Not Requested") manually using the window data form. Only windows that are set to approved will use the function.

Windows created by a Change System interface will have the auto-send defaulted to the value from the resource definition in the resource table. Once the window is created using the default setting, an authorized user can change the setting manually via the Web Interface. For example, assume the default Autosend setting for a resource is "Requested." When a window is defined for this resource via the Change Interface, its initial AutoSend setting will be "Requested". The Web Interface can be used to change the window's AutoSend setting to "Approved". Alternately, the Web Interface can be used to change the window's AutoSend setting to "Not Requested", overriding the default setting for the affected resource.

Confirmation of Window Status Changes

When ACT sends a window start or stop message to a TEC, it records the new window status as "pending" until it receives an acknowledgement from the TEC confirming that the window was started or stopped. The ACT server will resend requests for windows that are in a pending status for too long. For a TEC that is unresponsive for an extended period of time, ACT can automatically notify the support person for that TEC.

Users on the web interface can also see windows that have not been confirmed by the TEC so that they can resend the request manually if required rather than waiting for ACT to try the resend. (For example, if the TEC had been down and they know it is back up now.)

Window Record Archival

ACT includes a scheduled process that identifies windows that have been completed for more than a defined period, writes these windows to an archive file, and removes them from the ACT database. The period after which a completed window is archived is determined by the archive period of the affected resource, ACT or SDC. It is recorded in the window record at the time the window is created. Archival of window records can be expedited by using the web interface to change the window status to "Archive." No window record is archived until all other windows under the same activity are also ready to be archived. Once all the windows are ready to be archived, they are all archived together with the parent activity.

Security

ACT grants authority by group. An ACT user can be in any number of groups giving it different levels of authority for different entities within ACT. For example, one user can be given "user" authority for all resources in an SDC, "subnet" authority for one TEC that serves the SDC, and "administrator" authority for all resources under one account within the SDC. "User" authority on an SDC would allow the user to define windows for any individual resources within the SDC. "Subnet" authority for a TEC would allow the user to define windows for entire subnets on that TEC. "Administrator" authority on an account would allow the user to modify information about the account and all subaccounts or resources under the account.

Automatic Repetition of Activities

The ACT Web Interface will allow users to specify an interval (in days) at which an activity should be repeated. If this option is requested, once the original activity (or most recent duplicate) is changed to finished status, ACT will create a duplicate of the activity record and each underlying window record. The planned start and end dates for the duplicate activity will be calculated by adding the specified interval to the planned start and end of the original record (or most recent duplicate).

Tec Processing

At Start of Window

The TEC receives a CHANGE_START event at the start of a window. The event indicates the resource the change is for. There are two types of CHANGE_START events.

The first is of the resource type. It will specify an individual resource id such as a given server. It can optionally specify an application id in which case it only applies to events for that application on the server vs the entire server.

The second is of the subnet type. It specifies the first three octets of an IP address and applies to any event that contains an IP address in the origin slot that starts with those three octets.

When the TEC receives a CHANGE_START event, the event status is changed to ACK so that it will not be displayed on the operator TEC consoles. Then the TEC records a confirmation message for the ACT server indicating that the event has been processed.

The CHANGE_START event is normally sent by the ACT server but it can also be generated by a script on a server when the server is being auto-rebooted. A confirmation is sent to the ACT server in both cases.

For Events Received During a Window

If an event makes it past the duplicate detection and correlation steps on the TEC rulebase but before ticketing and notification is performed, the TEC searches to see if it has a CHANGE_START event covering the event. The event is covered by ACT suppression if any of the following conditions are met: there is a resource CHANGE_START for the same resource id, there is a resource CHANGE_START for the same resource id and applied, and there is a subnet CHANGE_START where the subnet matches the first three octets of the IP address in the origin slot of the event, If the event is under suppression, the status is changed to ACK and the Info_Ticket slot is set to match the window id of the CHANGE_START event that suppressed it. The rules are then exited so no further actions will be taken on the event.

If the event is not under suppression, the ACT rule exits and allows the event to continue flowing through the remainder of the TEC rules.

At End of Window

A CHANGE_STOP event signals the end of a window. When the TEC receives a CHANGE_STOP event, the TEC will: record a confirmation message for the ACT server indicating that the event has been processed, if no matching CHANGE_START event exists, just drop the event and exit, close the matching CHANGE_START event so no new events will be suppressed, set the status of the CHANGE_STOP to ACK so it will not be displayed on an operator console, if the window type is tolerance window, wait the tolerance interval for clearing events to be received, dump the events from the event repository that have been suppressed by the window. Note that only events that are still in the event repository will show up in the log. if the window is a tolerance window, change the status of any suppressed events that are in ACK status back to OPEN so they will be driven through the TEC rules to be acted upon. if the window is a standard window, close any suppressed events that are in ACK status. close the CHANGE_STOP event.

There is one exception to the standard end of window processing. When a CHANGE_START is generated by a script rather than from ACT, the event indicates how long the window should last. If the CHANGE_START event has not been closed by receipt of a CHANGE_STOP before that time, then the TEC will generate an associated CHANGE_STOP event and an error event indicating that the auto-reboot has failed. The auto-generated CHANGE_STOP event will be processed like any other CHANGE_STOP.

Figure 2:
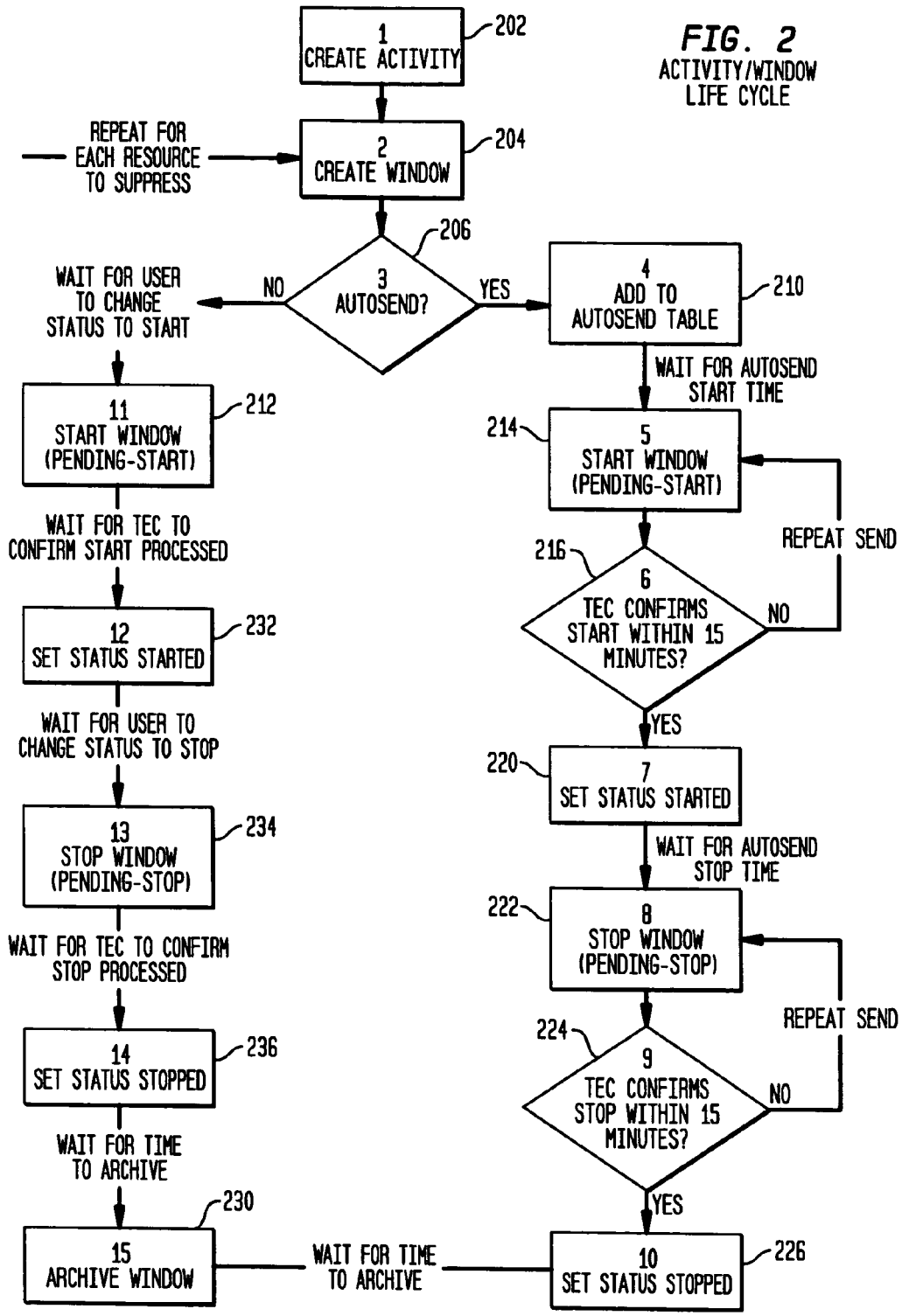
FIG. 2 is a flow chart showing a summary of the preferred activity of a window record that may be used in the event suppression tool of this invention.

FIG. 2 is a flow chart shows a summary of the activity and window life cycle from the time an activity is created until it is archived out of the database.

The lifecycle starts, at step 202, when a new Activity is created. It can be created via an automated interface to a change management system or via web user interface. The activity record contains the Geography or SDC the activity is for, the type (Change, Disco, Transition . . . ), a user reference number, and the scheduled start and stop times. The activity is assigned a unique identifier by the system.

Once the activity is created, one or more Windows needs to be added, at step 204, under the activity. The following steps would be repeated for each one. Each window can be for a particular resource or for a subnet and each window will have a unique window id assigned by the system. Each window record contains the name of the TEC that the window is to run on, the affected resource and optional application on the resource, the archive time, and if the window should be scheduled to be started and stopped automatically by ACT.

At step 206, a decision is made. If the window is set for autosend, then continue with step 210 for this window. Otherwise continue with step 212 once an ACT user changes the window status to Start.

Since the window has the autosend flag on, the system adds a start and stop record for the window to the autosend table. This is the table that the autosend process uses to know when to send requests to TEC. Nothing further happens to the window until the scheduled start time. At that time, continue with step 214.

Since it is now time for the window to start, the autosend process sends a start request to the TEC listed in the window record and sets the window status to pending-start. When the TEC completes processing the start request, it sends a confirmation back to the ACT server at step 216. At that point, the TEC will be suppressing new events that fall under the suppression window.

When the confirmation is received, continue with step 220. If the confirmation has not been received within 15 minutes, the request may have been lost. In that case, go back and repeat step 210 to resend the request.

When the confirmation is received, ACT updates the window status, at step 220, to Started from pending-start. Nothing further happens to the window until the scheduled stop time. At that time, continue with step 222.

Since it is now time for the window to end, the autosend process sends a stop request to the TEC listed in the window record and sets the window status to pending-stop. When the TEC receives the stop request, it will dump the events that have been suppressed to a log file, close the window so it will no longer suppress new events, and then, at step 222, send a confirmation back to the ACT server.

When the confirmation is received, continue with step 224. If the confirmation has not been received within 15 minutes, the request may have been lost. In that case, go back and repeat step 222 to resend the request.

When the confirmation is received, ACT, at step 226, updates the window status to Stopped from pending-stop. Nothing further happens to the window until the archive time has past. Then continue with step 230.

If at step 106, the window is not set for autosend, the process continues to step 212. Since the ACT user has changed the status to Start, ACT sends a start request to the TEC listed in the window record and sets the window status, at step 212, to pending-start. When the TEC completes processing the start request, it sends a confirmation back to the ACT server. At that point, the TEC will be suppressing new events that fall under the suppression window. When the confirmation is received, continue with step 232.

When the confirmation is received, ACT updates the window status to Started from pending-start. Nothing further happens to the window until an ACT user changes the status from Started to Stop. At that time, continue with step 234.

Since the user changed the status to Stop, ACT sends a stop request to the TEC listed in the window record and sets the window status to pending-stop. When the TEC receives the stop request, it will dump the events that have been suppressed to a log file, close the window so it will no longer suppress new events, and then send a confirmation back to the ACT server. When the confirmation is received, continue with step 236.

When the confirmation is received, ACT updates the window status to Stopped from pending-stop. Nothing further happens to the window until the archive time has past. Then continue with step 230.

Since it has past the time when the window record can be archived, the record is copied to an archive log and deleted from the ACT window database. If there are no more window records for the activity record, then the activity record is copied to the archive and deleted from the activity database also. At this point, no further processing takes place on the window and the process ends.

Authority Types

As referred to above, there are four authority types within ACT: Superuser, Administrator, Resource User, and Subnet User.

Resource User

A Resource User is able to add/update activity and window records for resources within his or her scope. The scope is:

Account Subgroup Level User

This is when the user is a member of a group that is listed as a Resource User Group in an account subgroup record. Their scope is resources in that account subgroup.

Account Level User

This is when the user is a member of a group that is listed as a Resource User Group in an account record. Their scope is any resource owned by the account.

Geography/SDC Level User

This is when the user is a member of a group that is listed as a Resource User Group in a geography/sdc record. Their scope is any resource owned by any account within the geography/SDC.

Subnet User

A Subnet User is able to add/update activity and window records for subnets. Since there are no resource records for subnets and suppressing events based on a subnet is very powerful, there are special controls placed on this authority.

In order to create a subnet window on a particular TEC, the user must be in a user group granted subnet user authority for the TEC.

Administrator

An administrator is able to add/update/delete resource data and user data within his or her scope.

Geography/SDC Level Administrator

This is when the user is a member of a group that is listed as an Admin group in an account record. They can:
add/delete userids for the geography/SDC,
add/change/delete account records for the geography/SDC,
add/delete account subgroup records, and
add/change/delete user groups for the geography/SDC (including adding or removing users and assigning admin groups).

User Group Level Administrator

This is when the user is a member of a group that is listed as an Admin group in a user group record. They can: add/remove existing ACT users from the group.

Superuser

Superuser's are defined at the ACT instance level. A superuser can do anything any other user of the system can do plus:
add/change/delete geography/SDC records,
add/change/delete TEC records, and
update application data.

Web Based User Interface

The primary interface to ACT is a web-based user interface. This interface preferably includes an Administrative interface and an Alert Suppression interface. The Administrative Interface is used to create and maintain various types of reference data used by ACT. The Alert Suppression Interface is used to document, track and execute alert suppression windows.

The web-based user interface may be run on Websphere Application Server.

The Administrative Interface will allow authorized users to add, update and delete the following types of reference data. This data will be used in the creation, modification and disposition of activity and window records.

Resource Data—resource data includes SDC/Geography records, account records, account subgroup records, and actual resource records.

User Data—user data includes user records and group records, and group membership records.

TEC Data—TEC data includes records for each TEC identifying its IP address, the Geography(s)/SDC(s) it supports, and who to contact with any problems.

Application—a list of applications. Users will select from this list when creating or updating window records.

Property—the contents of the ACT property file.

An Administrative Interface navigation bar will provide access to each type of reference data.

Alert Suppression Interface

The ACT Alert Suppression Interface allows authorized users to add, update, review and delete data about activities that will require alert suppression and the alert suppression windows themselves. It allows authorized users to start and stop alert suppression windows, or set them up to be started and stopped automatically using an ACT Autosend feature.

ACT also includes a Change System Interface to allow automated creation and cancellation of suppression windows based on change records in the change system or other auto-provisioning tool. The interface defines a flat file format that the change system may use to create batches of changes for each ACT server that it supports. The code to extract the information from the change system into this flat file is unique on each change system and is not included as part of ACT. The interface delivered with ACT is the file specification and the code to retrieve the file from the change systems and process the data on the ACT server.

Each change system is defined as a user in ACT. The ACT userid will match the unique change system name which could be its short hostname. Authorization to create a window for a particular resource may be controlled via the same authorization scheme used for any other user. Thus the change system userid is placed in one or more user groups in order to have authority to create suppression windows.

Configuratin System Interface

ACT includes a Configuration System Interface to allow automated creation, update, and deletion of Resource records in the ACT resource table. It will also create a stub Account record when a resource is added for an account that does not already exist in the Account table.

The interface defines a flat file format that the configuration system may use to create batches of add/change/delete resource records. The file preferably only contains resource records that were added, deleted or changed since the last extract file was produced. The code to build this file will be unique on each configuration system or provisioning system.

The interface delivered with ACT is the file specification, the code to retrieve the file from the configuration systems, and the code to process the extracted data on the ACT server. Many specific technologies can be used to deliver the request, such as SOAP. This is just one example for achieving this delivery.

Each configuration system will be defined as a user in ACT. The ACT userid will match the unique configuration system name which could be its shortname. Authorization to create resources will be controlled via the same authorization scheme used for any other user. Thus the configuration system userid has to be placed in one or more user groups in order to have authority to create resources. In general, it would be best to place it in a group that has admin authority for a Geography/SDC. If it is only given authority at the account id level, then the account must be defined to ACT before the first extract; the batch load would not be able to add the account record since the user would not be authorized.

The ACT configuration System Interface has three components: input specification, batch script, and batch loader. These components are discussed below.

The input specification defines the file name and format the configuration system must follow for creating the file or files that will be input to the interface. The configuration system is responsible for creating the input file(s) as often as needed. It is possible for a given configuration system to contain resources that are handled by different ACT systems. For each ACT system, it must have a separate directory where these request files will be placed.

Each time the configuration system creates the extract of the records for a particular ACT instance, it should include one record for each resource that was added, deleted or modified since the last time the extract ran. It may create a separate file each time it runs. The file should be created in a working directory and then moved into the directory accessed by ACT. This will prevent an execution of the ACT File Mover from disrupting creation of the file.

The batch script is used to pull the input files from a configuration system to the local system and then call the batch loader to process those files.

The script will only process one configuration system per call, and takes that system's ACT userid and File Mover configuration file name as inputs. It is scheduled via cron and the interval can be customized to fit the process for that configuration system. There may be a separate entry in cron for each supported configuration system.

When the script is executed, it passes the configuration file name to the File Mover program, discussed below. The File Mover uses the configuration information to know which system to go to and which files to pull back as well as where to put the files on the local system. When it completes, it returns to the batch script with a return code. If the File Mover retrieved any files, the batch script invokes the batch loader to process the files. It passes the name of the configuration system and the directory that contains the files to the loader. When the batch loader completes, the batch script ends.

When the batch script starts, it first checks to see if another instance is already running with the same arguments. If so, it just ends so that only one process will ever be trying to handle a given configuration system's data.

Figure 3:
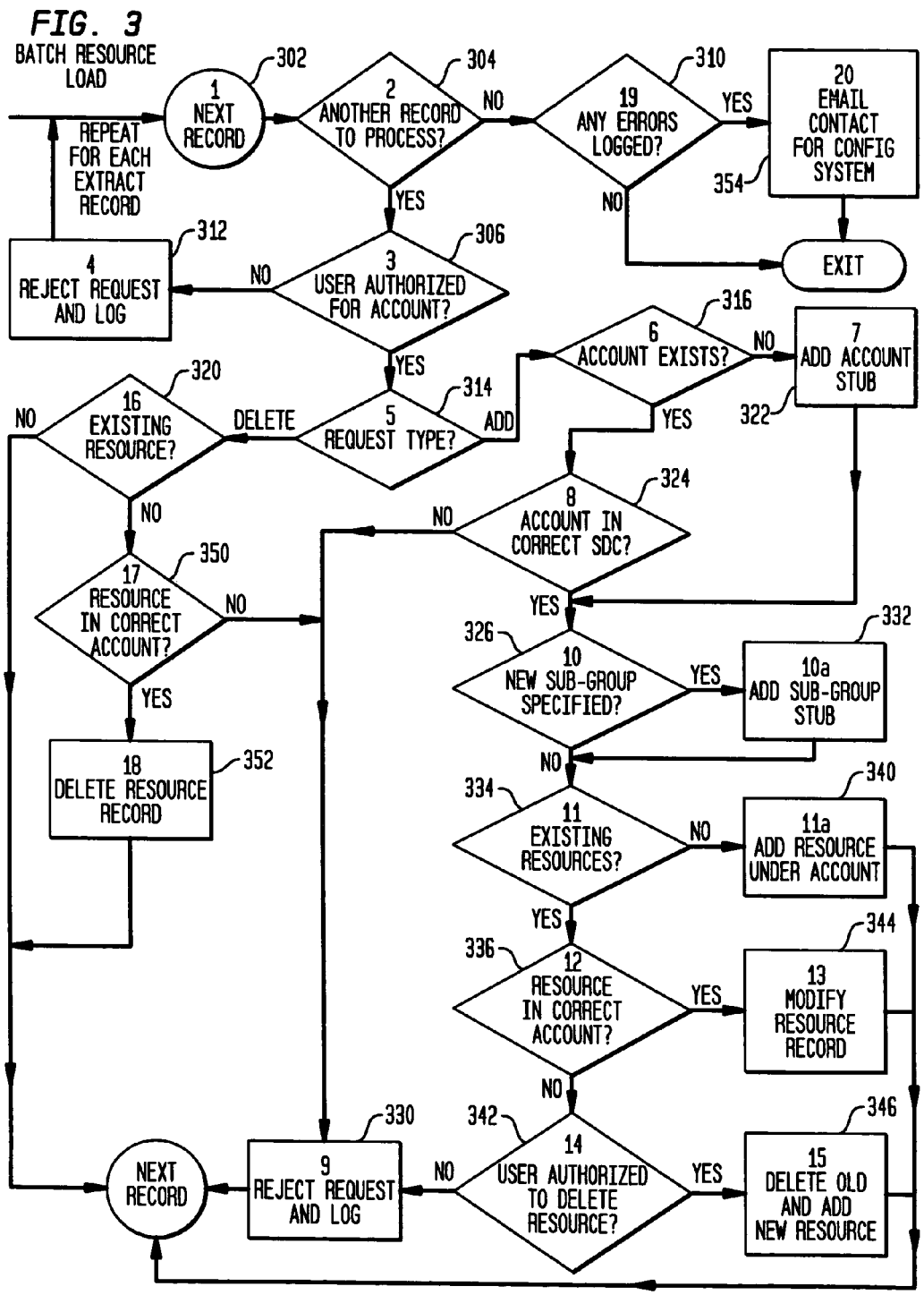
FIG. 3 shows the processing flow of a batch loader that may be used in the implementation of this invention.

The batch loader is called to process the extract files from a particular configuration system. It is passed the name of the configuration system. It will process each file in time sequence order. The FIG. 3 diagram shows the processing flow.

Each cycle starts, at step 302, with the next input record from the file. As represented by step 304, if there is another record to process, continue with step 306. Otherwise go to step 310.

At step 306, a determination is made as to whether the userid of the configuration system is authorized for this account. To be authorized, either the account has to exist and the user is in a group listed as an admin group for it, or the user is an admin user for the organization. If the userid is not authorized, go to step 312. Otherwise go to step 314.

At step 312, since the user is not authorized, the process rejects the record and logs it. Then go back to step 302 to process the next record.

If the user is authorized, then at step 314 a decision is made as to whether the request is an add or a delete. If a delete, go to step 316. Otherwise continue with step 320.

At step 320, it is determined whether the account id exists in the ACT database. If not, go to step 302. Otherwise go to step 324.

At step 322, the account is added to the account database under the organization indicated in the record. The defaults from the organization record are used. The account record is just a stub since it does not contain any admin or resource user group definition. Then go to step 326.

At step 324, a decision is made as to whether the account is in the organization indicated in the request. If so, go to step 326. If not, go to step 330, as the request needs to be rejected. Moving an account from one organization to another is done manually by deleting the account and re-adding under the correct organization.

Step 330 is to reject the request and log with an appropriate message. Then go back to step 302 to process the next record.

Step 326 is to decide whether the request specifies one or more account sub-groups that does not exist. If so, go to step 332. Otherwise go to step 334.

Step 332 is to add the sub-group(s) to the database. The group record(s) is just a stub since it does not contain any resource user group definition but it will allow the resource to be added under the group. From step 332, go to step 334.

At step 334, a decision is made as to whether the resource already exists. If so, go to step 336. Otherwise continue with step 340.

Step 340 is to add the resource to the resource table under the specified account using the values in the request plus the defaults from the account record. This includes associating it to any groups specified in the request. Then go back to step 302 to process the next record.

At step 336, since the resource already exists, a decision is made as to whether that resource is defined under the account specified in the request. If not, go to step 342. Otherwise, go to step 344.

Step 344 is to modify the resource as specified in the request including adding the subgroups specified in the request if they are not already in the list. Do not remove any subgroups that are already listed if they are not in the current request.

Step 342 is to determine whether the configuration system userid is authorized to delete the existing resource record. The account that owns the record could even be in a different organization. If not, go to step 330, as we need to reject the request. Otherwise, continue with step 346.

At step 346, since the account has changed, the existing resource is deleted and then added under the new account with the defaults from the account record. This includes associating it to any groups specified in the request. Then go back to step 302 to process the next record.

Step 320, which is reached from step 314 if the request is for a delete, is to determine if the resource exists in the resource table. If not, drop the request and go back to step 302 to process the next record. Otherwise, continue with step 350.

Step 350 is to determine if the resource in the account is specified in the request. If not, go to step 330 since the request needs to be rejected. Otherwise continue with step 352.

Step 352 is to delete the resource from the resource table. Then go back to step 302 to process the next record.

If, at step 304, there are no more records to process, then the process continues to step 310. This step is to determine whether there were any rejections in the batch. If so, go to step 354. Otherwise the process is done.

At step 334, since there were errors, the logfile is sent to the email address for the configuration system userid so they can research. Then the process is done.

TEC Interface to ACT

The TEC interface to ACT is used for bringing data from TEC into ACT. There are two types of data. The first is confirmation for processing a start or stop request. The second is suppressed event log data.

Confirmation Data

When ACT sends a request to TEC, it sets the window status to pending-start or pending-stop depending on if the request was a start or stop request. When the TEC rules actually process the request, it will record a confirmation record in a local file.

Every minute, ACT will invoke a File Mover function to go to each supported TEC to retrieve any confirmation files. For each retrieved file, it will process the request.

Each file indicates the type of request (start or stop) and the associated window. If the window is found in the Window table, the status is updated. If not, then it is assumed that the confirmation was for a window generated on the TEC. A window record is then created in the appropriate status.

Log Data

When a user requests to see the log of events that were suppressed for a stopped window, ACT calls the File Mover to retrieve a copy of the log file from the TEC server. It then displays the log to the user via their browser.

When a window is in "stopped" status, the window data entry form includes an option to display the log created by the TEC for the window. When this option is selected, ACT uses the File Mover utility to get the log from the TEC.

The File Mover requires the following inputs to retrieve the file:
TEC Operating System,
TEC IP Address,
ACT login ID for the TEC,
Name of the log file,
Source directory location on the TEC, and
Destination directory location on the ACT server.

If the log retrieval is successful (as indicated by the File Mover return code), ACT will read the file from the directory location and display it on the Web Interface. If it fails, an alert will display notifying the user that the log could not be retrieved and the type of error that occurred.

Autosend

The ACT AutoSend feature can be used to automatically start and stop windows at the scheduled start and stop times. AutoSend is optional and controlled at the individual window level.

Request and Approval

Each window record includes an AutoSend field. The valid values and their meanings are:
not requested—AutoSend is turned off for this window.
requested—AutoSend is requested but has not been approved yet. AutoSend will not process a window with this setting.
approved—AutoSend will process this window.

When a window's AutoSend field is set to "approved," ACT uses the parent activity's planned start and stop times to schedule start and stop events for the window in AutoSend. Subsequent changes to the parent activity's planned start or stop times will be reflected in the AutoSend schedule. If the window's AutoSend field is subsequently changed from "approved" to a different setting, the window's start and stop events will be removed from the schedule.

For a window created manually using the ACT Web Interface, the AutoSend field will default to "not requested" and can be changed manually on the window's data entry form. For a window created automatically using the ACT Change System Interface, the AutoSend field will be set equal to the value specified as the default in the affected resource's record in the resource table. In either case, once a window record has been created, its AutoSend setting can only be changed manually using the ACT Web Interface; subsequent changes to the AutoSend setting for the affected resource are not be reflected in existing window records for that resource.

Scheduling and Sending Events

Figure 4:
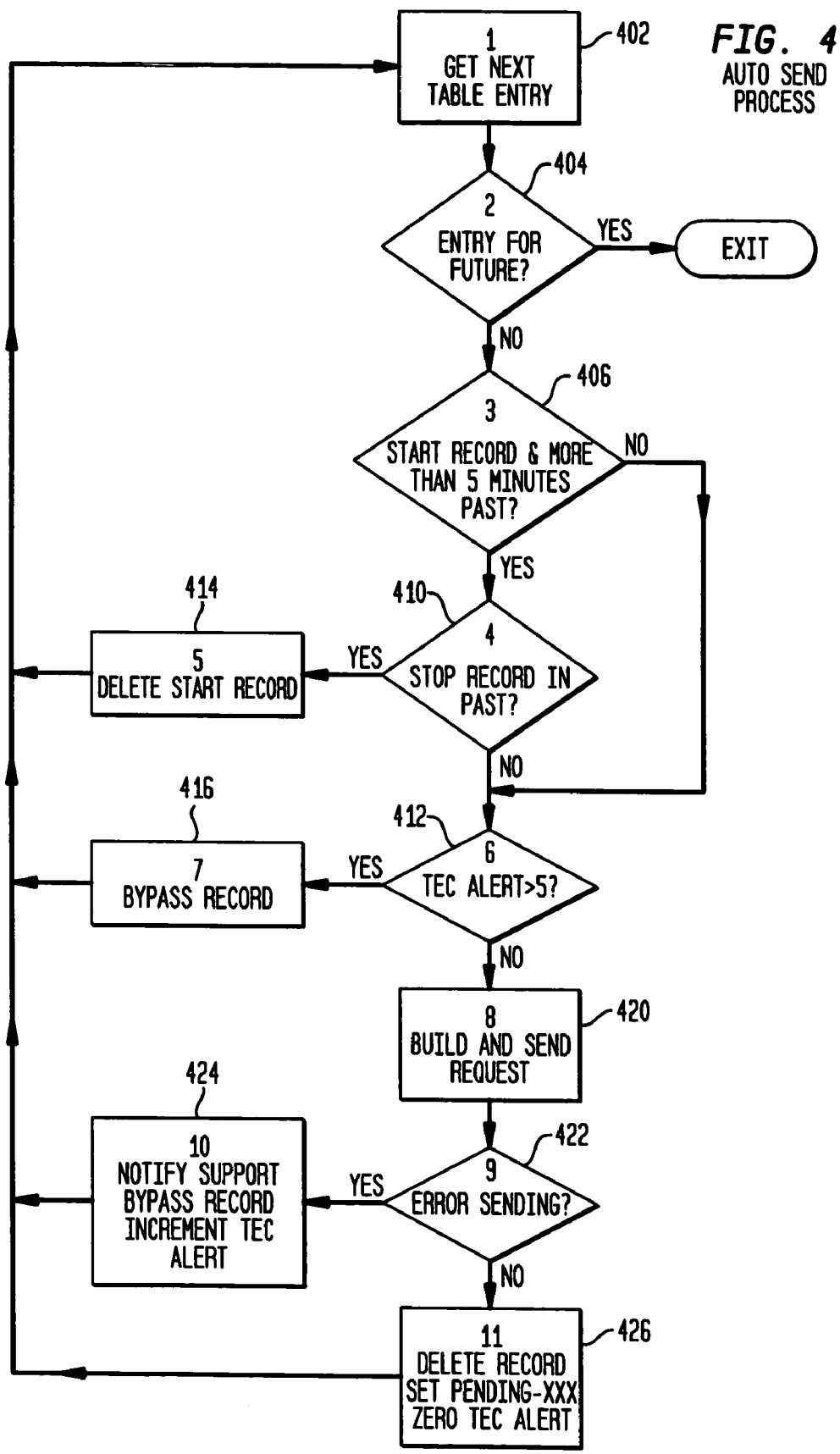
FIG. 4 illustrates the operation of an AutoSend feature that may be used in the present invention.

The schedule used by AutoSend is recorded in a database table. AutoSend checks this schedule every minute and processes each entry whose send time is in the past. The processing flow is depicted in FIG. 4.

At step 402, the next record from the AutoSend table is read. The records are in time sequence order with the oldest on top.

Step 404 is to determine if the entry is for the future. If so, then all current requests have been processed, and the routine exits. Otherwise, from step 404 continue with step 406.

At step 406, a decision is made. If the record is for a start request and it is more than 5 minutes past the time it should have started, then the system must have been down for a while. In that case, go to step 410. Otherwise go to step 412.

At step 410, since the window should have started more than 5 minutes ago, the process first needs to see if the window should have already stopped also. If so, then go to step 414. Otherwise go to step 412.

Since, at step 414, the window should have ended already, this record does not need to be processed. Just delete the record from the AutoSend table and go back to step 402 to process the next record.

Since, at step 412, we have a record to send, we first need to see if the TEC is in an alert mode. This decision is made at step 412. If the last 6 attempts to send to this TEC have failed, go to step 416. Otherwise go to step 420.

At step 416, since the TEC is down, this record is bypassed. This record is left on the table so that it will be processed when the TEC comes back up.

Step 420 is to lookup the information needed to build the request using the window record and its parent activity record. Then the request is sent to the appropriate TEC.

Step 422 is to decide if there is an error sending to the TEC. If so, go to step 424. Otherwise go to step 426.

At step 424, since we were not able to send to the TEC, we need to notify support. We send an email to the contact listed in the TEC record. We increment the alert count in memory for this TEC also. Then bypass the record and go on to step 402 to process the next request. When someone fixes a problem that is causing an error getting to a TEC, the count will be reset manually using a button on admin interface.

At step 426, since the request was sent to the TEC, we delete the record from the AutoSend table. Then update the status of the window to the appropriate pending status to indicate that the request has been sent. Then go back to step 402 to process the next record.

Preferably, the AutoSend process includes an auto-retry deamon that checks every 5 minutes for AutoSend windows that have been in pending status for more than 15 minutes. Any such windows are added back to the AutoSend schedule to be sent again the next time AutoSend runs.

The AutoSend process preferably also includes a pending-alert deamon that checks every 60 minutes for windows that have been in pending status for more than 30 minutes. For any TECs that have windows in this state, the AutoSend process sends an email to the TEC contact indicating there are x windows in pending state for their TEC. It copies the creator and last updater for each of those windows on the note. In the case of a window that came from a change system, the contact listed in the userid for the change system is copied as the creator. The note directs the recipient to the appropriate ACT instance's Web Interface where he or she can view detailed information on the windows using the Alert Suppression Interface's Window List or Master List.

File Mover

The Interface to Change Management, Interface to Configuration Management and the Interface to TEC all need to be able to pull data files from remote systems back to the ACT system. Each of these functions relies on the File Mover function to actually handle retrieving the files from the remote systems.

The File Mover is a Perl or Java program that communicates to the remote system using OpenSSH over TCP/IP.

The File Mover is called each time a file or group of files needs to be retrieved from a particular system. It is passed the IP address of the system, the ACT userid on the system, the directory and pattern for the file(s) to retrieve, the directory to place the files in on the local system and the type of operating system that exists on the remote system.

Figure 5:
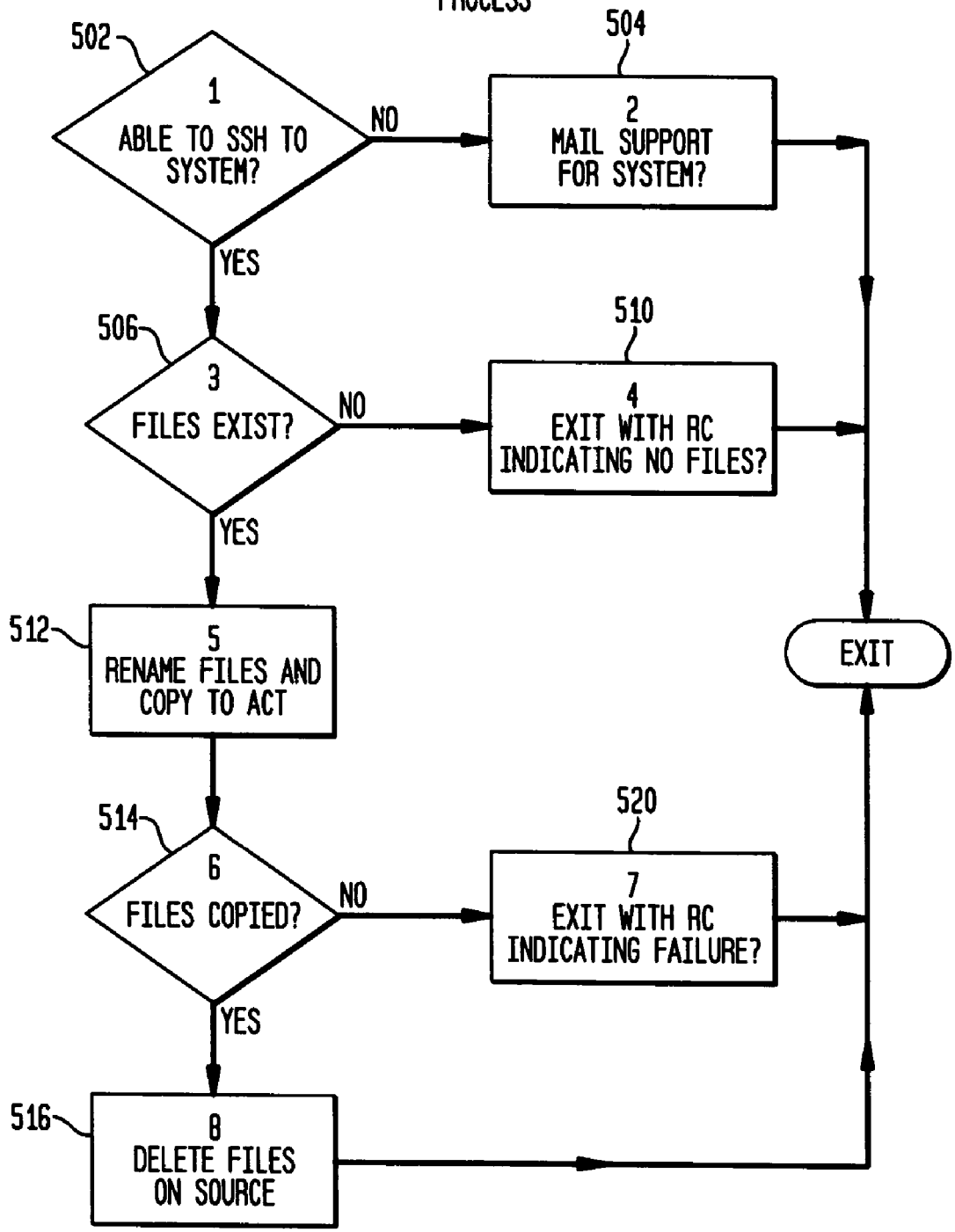
FIG. 5 is a flow chart showing the operation of a File Mover function that may be used in the practice of this invention.

The processing flow is shown in FIG. 5.

First, at step 502, we SSH over to the system to see if the file(s) exist. If we are not able to SSH to the system, we retry one time. If still fail, go to step 504. Otherwise continue with step 506.

We need to build an alerting mechanism for failures. It may be desirable to keep track of failures and only notify on x failures in a row. Step 504 represents the fact that we could pass the number of failures to allow before notifying support and the notification point to the program. Then exit.

Step 506 is to decide if there are there any files to retrieve. The method used to check for the files depends on the OS of the destination system. If there are no files, go to step 510. Otherwise go to step 520.

Step 510 is to exit with a RC indicating there were no files.

At step 512, since there are files to move, we first rename the files on the remote system to make sure no application tries to write to them while we are moving them. Then we copy each using scpy. We check the file size of the file on both systems. Then go to step 514.

From step 514, if the files copied over correctly, go to step 516. Otherwise go to step 520.

Step 520 is to exit with a RC indicating there was a failure. Should notify support at this point. May want to generate a TEC event as the notification so that duplicate detection and all can take place there. Would need to define the TEC that is used for support of the ACT server. HealthCheck is preferably used to make sure communication between the ACT server and the owning TEC is working. Could also be a heartbeat process.

At step 516, since the file(s) were copied, delete them on the origin server. Then exit with a RC indicating we received files.

TEC Rules and Processes

ACT Ruleset

There are several flows in the ACT ruleset.

The first flow is for processing CHANGE_START events at the start of an ACT window.

The second flow handles CHANGE_STOP events at the end of an ACT window.

The third flow handles the suppression of events during windows.

The fourth flow handles setup for ACT when the TEC is restarted.

Each of the flows is described below.

Act Change_Start Processing

Figure 6:
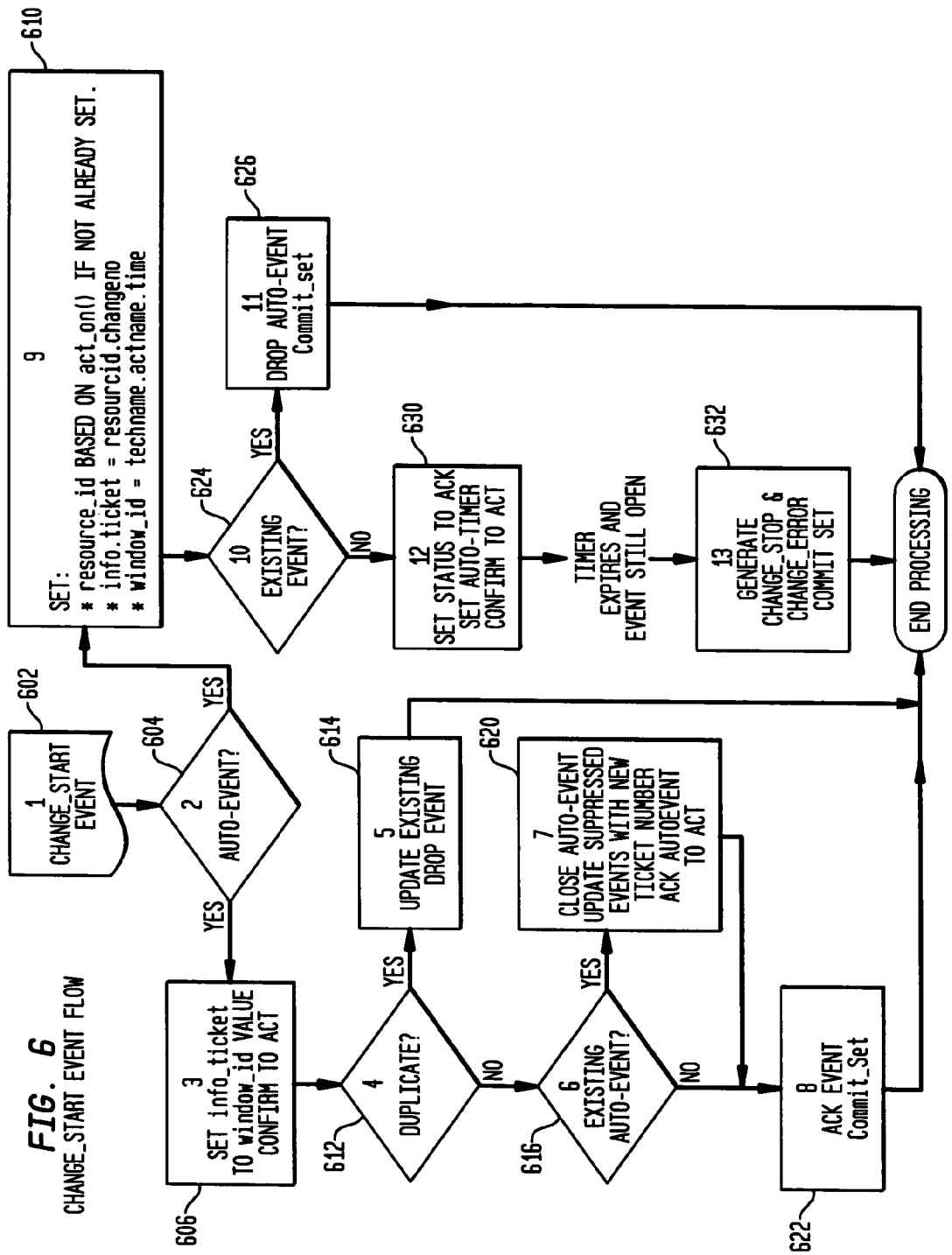
FIG. 6 shows the processing when a Change Start event is received in the preferred operation of this invention.

FIG. 6 shows a flowchart of the processing when a CHANGE_START event is received. The event could be from the ACT server or an automated event sent from a script on a managed server.

Each cycle starts, at step 602, when a CHANGE_START event is received.

If, at step 604, the failed_auto_change_seconds slot is set to 0 indicating that the event is not an auto-change window, then continue with step 606. Otherwise go to step 610.

If the routine proceeds to step 606, this means that the event is an ACT GUI event. Set the info_ticket slot with the value from the window_id slot. This value contains the key to the record in the ACT database and contains the ACT instance name followed by a unique number. This is used as the name of the log file that contains the events that were suppressed in this window also.

Send a confirmation to ACT to indicate that the change_start event has been processed. The notification to ACT is done via call to external script ACT_confirmation.ksh.

Step 612 is to determine if an event is a duplicate. If the event is a duplicate, meaning that it is for the same window_id, then go on to step 614. (A single window must pertain to a subnet or a given resource id and optionally an application(s) on that resource.) Otherwise go to step 616.

If the routine proceeds to step 614, this means that the event is an update to a prior CHANGE_START event. Update the tolerance_len, window_type, and appl_ids slots. Then drop the new event and commit the set so no further processing will take place on the event.

If the routine proceeds to step 616, this means that the vent is a new GUI CHANGE_START event. If there is an existing auto-change event for this same resource, go to step 620. Otherwise go to step 622.

The GUI event takes precedence over the auto event so, at step 620, we need to close the auto-event and associate any events that were suppressed by it to the new GUI event. We also need to notify ACT that the auto-event window has been canceled. Then go on to step 622. The notification to ACT is done via call to external script ACT_confirmation.ksh.

At step 622, since this is a new GUI event, we need to set the status to ACK and commit the set so no further processing takes place.

At step 610, since the failed_auto_change_seconds slot is not 0, this is an auto-event. We need to set the info_ticket, resource_id, and window_id slots.

If the resource_id was not already filled in by the gsnma_facts, then set it based on any act_on( ) facts which were now recorded in the recorded database under act_on. If act_on is not set, we will default the name to the short hostname. We drop any spaces from the value. We translate to upper case even if it was already set. If still no value, close the event and log in the dropped log. Cannot suppress if we do not find a resource_id. (We use the get_resource_id_for_act predicate to get the value)

The info_ticket slot is built by concatenating the resource_id with the change_no slot set at the source with a dash between them.

The window_id slot is used as the key for the window record in the ACT database and must be unique. It is built by concatenating the short tec hostname, the short ACT instance name and the seconds since epoc on the TEC down to milliseconds with periods between each. (just add three digits to seconds since epoc since TEC cannot get to milliseconds). If that value is not unique (i.e., there is another event in the cache with that window_id), then increment the number. Continue with step 624.

Step 624 is to determine if there is an existing CHANGE_START event for this resource. If so, continue with step 626. Otherwise go to step 630. There are two cases where the auto-event will match an existing CHANGE_START event: auto-event is for entire server and the entire server is already under change, and auto-event is for an application on a server and that application is already included in another CHANGE_START event.

At step 626, since this auto event is a duplicate window, just drop the event and commit the set so no further processing will take place. Log the drop in the dropped.Mondd log.

At step 630, since this is a new auto event, we need to set a timer to the number of seconds specified in the failed_auto_event_seconds slot so we can make sure the change ends on time. Then set the status to ACK, notify ACT, and commit the set so no further processing takes place for the event until the timer expires. When the timer expires, if the event is not closed, go to step 622. If the event is closed, no action is taken. The notification to ACT is done via call to external script ACT_confirmation.ksh.

At step 632, the timer has expired on the auto CHANGE_START event and it is not closed yet so it needs to be reported as a failure and the window closed. To close the window, an associated CHANGE_STOP event is generated by the rules. Then a CHANGE_ERROR event is generated to indicate that there was a failure. The msg slot is set to "hostname origin Auto-change window ran over or change failed"

and the info slot contains the name of the log file that contains the events that were suppressed due to this CHANGE_START event. The CHANGE_STOP must not set the window_id in this case.

It may be noted that the only valid way to close a CHANGE_START event is via receipt of a corresponding CHANGE_STOP event. Thus, if an administrator tries to close a CHANGE_START event, the change request is dropped.

Act Change_Stop Processing

Figure 7:
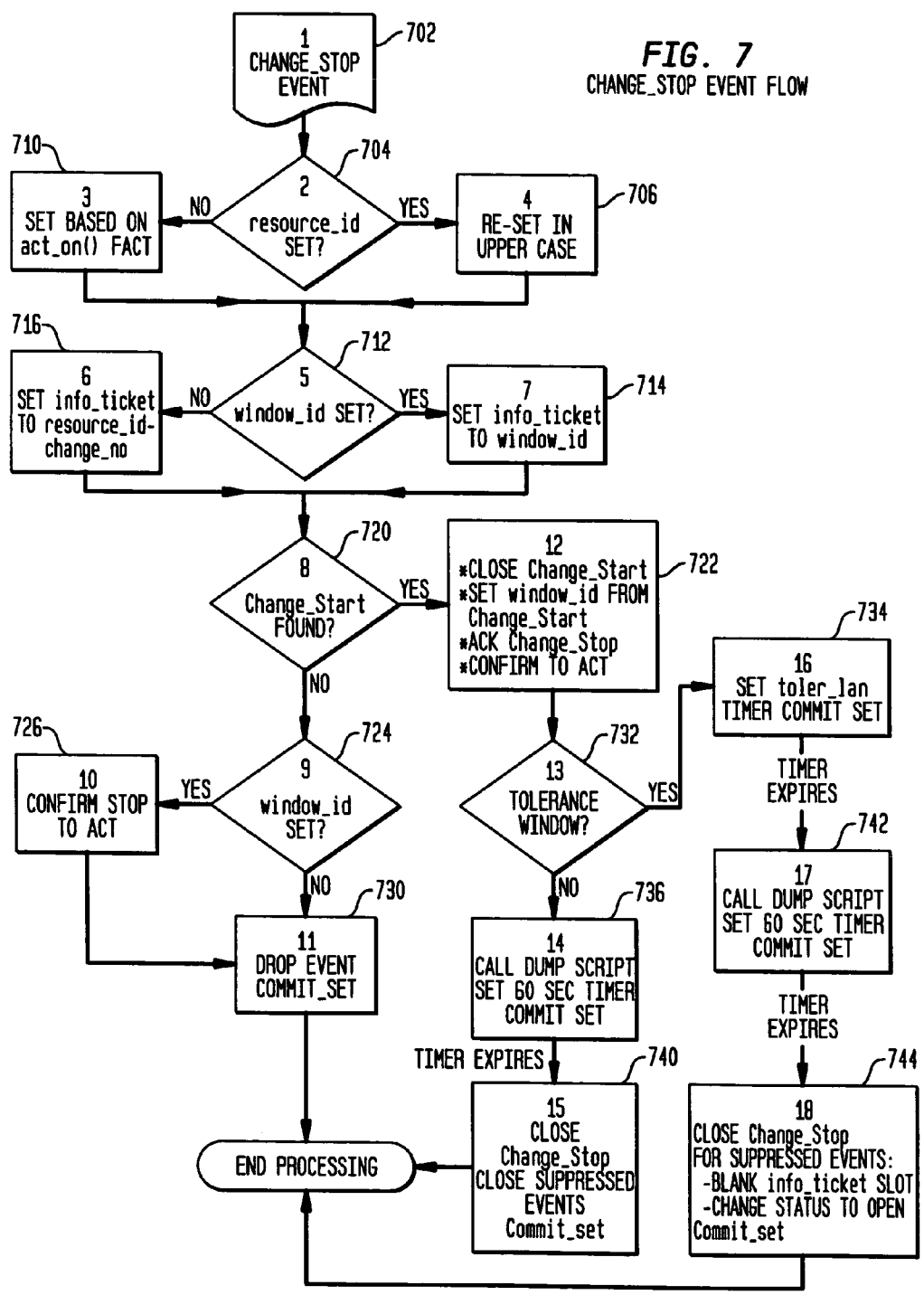
FIG. 7 illustrates a procedure for processing a Change Stop event.

FIG. 7 shows a flowchart of the processing when a CHANGE_STOP event is received. Each cycle starts at step 702, when a CHANGE_STOP event is received. At step 704, a decision Is made. If the resource_id slot is set, go to step 706. Otherwise go to step 710.

Step 710 is the case for an auto generated event. If the resource_id was not already filled in by the gsnma_facts, then set the resource_id based on any act_on( ) facts which were recorded in the recorded database under act_on. If act_on is not set, we will default the name to the short hostname. We drop any spaces from the value and translate to upper case. (We use the get_resource_id_for_act predicate to find the value). If there is no value for the resource_id, close the event, log it in the dropped log, and commit the set. Otherwise, continue to step 712.

Step 706 is the case with an event generated from the Web GUI. Set the resource_id slot to upper case. Then continue with step 712. At step 712, another decision is made. If the window_id slot is set, go to step 714. Otherwise go to step 716. Step 716 is to set the info_ticket slot to resource_id-change_no. (auto event). Continue with step 720.

Step 714 is to set the info_ticket slot to match the window_id slot. (GUI event). Continue with step 720. Step 720 is to determine if an associated CHANGE_START event is found. If so, go to step 722. Otherwise continue with step 724. At step 724, since there is no associated start event, it may have been lost. If the window_id slot is set, go to step 726. Otherwise go to step 730.

At step 726, since there is a window_id, the CHANGE_STOP came from the ACT server. In that case, we need to send a confirmation back to ACT so it knows we received the event and can update its database. Call external script ACT_confirmation.ksh. Then continue with step 730. This step 730 is to drop the event and commit the set so no further processing takes place.

Step 722 is reached if, at step 720, an associated CHANGE_START event is found. At step 722, since we have a matching change start event, we need to end it. The following actions are taken at this time. close the change_start event, set the window_id of the change_stop to match the change_start, set the status of the change_stop to ACK, and send confirmation to ACT. The confirmation to ACT is done via call to external script ACT_confirmation.ksh.

Continue with step 732, at which a decision is made as to whether the window is a tolerance window. If so, go to step 734. Otherwise continue with step 736. Step 736 is to call/usr/local/Tivoli/custom/tec/dump_events_in_window.pl to dump the events that were suppressed to a log file specific to this window. Set a 60 second NORMAL WINDOW timer on the change_stop event and exit. The 60 second timer will give the dump process time to finish before the next step. When the timer expires, continue with step 740.

Preferably, the TEC also runs a daily timer that will call the dump_events_in_window.pl script with a −c 60 argument. This will cause it to delete all the logs over 60 days old.

At step 740, since this is a normal window and the NORMAL WINDOW, we now close all the events that were suppressed, close the change_stop event and commit the set. For the events we close, we use CHANGE vs SET so that the closes will synch back to lower level TECs if any.

At step 734, since this is a tolerance window, we need to wait the tolerance length of time for clearing events to come in so we set a TOLERANCE WINDOW1 timer and commit set to end processing. Continue with step 742 when the timer expires.

At step 742, since the TOLERANCE WINDOW1 timer has expired, call/usr/local/Tivoli/custom/tec/dump_events_in_window.pl to dump the events that were suppressed to a log file. Set a 60 second TOLERANCE WINDOW2 timer on the change_stop event and exit. The 60 second timer will give the dump process time to finish before the next step. When the timer expires, continue with step 744.

At step 744, now that the TOLERANCE WINDOW2 timer has expired, close the change_stop event. Then for each non-closed event that was suppressed:
pre-pend "From Change Window:" to the msg slot,
set the info_ticket slot to blank, and
change the status to OPEN.

Then commit the set to end processing.

Act Suppression Processing

The ACT ruleset needs to be placed in the rulebase after all duplicate detection and correlation processing but before any automated actions such as notification and ticketing. The ruleset will process all new non-HARMLESS events that make it this far through the rulebase rule order and all change events where the status is changed to something other than CLOSED or the severity is changed. For the GSNMA standard rulebase, it may be loaded between gsnma_facts.rls and gsnma_ticketing.rls.

If an event is covered by a window, all further processing is bypassed. (Step 8 of New Event Flow from section 2.1 and Step 6 of Change Event Flow from section 2.2).

FIG. 8 shows a flowchart of the processing when an event reaches the ACT ruleset. The process starts, at step 802, when a new non-HARMLESS event or a changed event reaches the ACT ruleset. For a change event, it only fires on a status or severity change. For a status change, it does not fire when the status is changed to CLOSED. Bypass if one of these conditions is not met.

As represented at step 804, if the resource_id slot is set in the event then translate to upper case and use that as the check_value and go to step 8. Otherwise continue with step 2.

In the standard GSNMA ruleset, the resource_id slot should be set but if ACT is installed in another rulebase, it may not be. In that case, ACT can be set to use either the hostname slot or the origin slot. In USF v3, hostnames are unique and the short hostname could be used. In USF v5, ip addresses are unique and the origin slot could be used. It may be noted that steps 804, 810, 812, 814, 816, 820 and 822 are performed by the get_resource_id_for_act predicate described in section B.8.

Each suppress window pertains to a particular resource or IP subnet. An event can be associated to a particular resource using multiple criteria. Normally, some external process would set a resource id field in the event based on this criteria. Some examples would be to set it based on the hostname, IP address, mac address, or some combination of these. If not set, ACT can be set to use values from other fields in the event as noted in steps 804, 812, 816, 820 and 822.

At step 814, if act_on is recorded as ORIGIN, then we will use the origin value, which is generally the IP address of the object. In that case, continue with step 816. Otherwise, go to step 820. At step 816, since we are set to use origin, record the upper case value from the origin slot in check_value. Then go to step 806. At step 820, if act_on is recorded as SHORT_HOSTNAME, then we will use the first word of the value in the hostname slot. In that case, continue with step 822. Otherwise, we do not have a resource to check, so we bypass the looking for a change for the resource and go to step 824.

At step 822, since we are set to use short hostname, we will take the first word from the value in the hostname slot. First, we truncate at the first period if that is more than 4 characters in from the left. (We do not want to truncate if it is an ip address) Then we truncate that value to the first underscore (_). The intent here is to drop the _tiv that was used as the Tivoli resource name. Then we translate that value to upper case and record it in check_value. Then go to step 806.

At this step 806, a search is made for a CHANGE_START event where the resource_id matches the check_value. If one is found, continue with step 826. Otherwise go to step 824. At step 826, if the appl_ids slot of the found CHANGE_START is blank, then the window is for the entire server. In that case, go to step 830 to suppress the event. Otherwise, continue with step 832.

At step 832, since the CHANGE_START specifies at least one appl_id, then it is for a subset of the server. If the applied is set in the bad event, then continue with step 834. If not, then this window does not cover the event. In that case, repeat step 806 to look for another CHANGE_START event for the resource. At step 834, since the CHANGE_START specifies one or more appl_ids and the bad event specifies an appl_id, check to see if the appl_id from the bad event is contained in the value(s) from the CHANGE_START. If it is, then go to step 830 to suppress the event. If not, repeat step 806 to look for another CHANGE_START event for the resource.

Step 824 can be reached from either step 806 or step 820. At step 824, since the event was not suppressed by a resource type window, we have to check if the event is suppressed by a subnet type window. If the origin slot contains an IP address, we first take the first three octets of the address and then continue with step 836. If not, we are done. Use get_three_octet_subnet predicate to get the subnet value. It fails if the origin slot does not contain an IP address.

At step 836, if there is a subnet type CHANGE_START event for this subnet (act_subnet slot set to 1 and resource_id set to the subnet), then go to step 830 to suppress the event. Otherwise the event is not suppressed and we are done.

At step 830, since the event is covered by a window, we need to suppress the event. The following actions are taken at this time. Set the event status to ACK. If the event is for a status change, drop the change request. Set the info_ticket slot to match that of the CHANGE_START event. Write an entry to the /var/Tivoli/logs/Events/ACT_suppressed.Mondd log indicating that the event has been suppressed. The format of the log entry is: time event_id:info_ticket:class:source:origin:hostname:severity:msg_part Commit the set to stop any further processing of the event.

Certain ACT initialization needs to take place when the TEC is restarted.

FIG. 9 is a flowchart of the processing that takes place when a TEC_Start or a gsnma_control with msg 'ACT Re-Init' event reaches the ACT ruleset. The gsnma_control with msg 'ACT Re-Init' allows a way for having the startup processing re-done without restarting the TEC.

The process starts, at step 902, when a TEC_Start event or gsnma_control event with msg set to 'ACT Re-Init' reaches the act ruleset. First, at step 904, we abolish any act_on, act_default_server, or act_keep_days facts that exist. Also we drop the associated recorded information. Then at step 906, the process determines If/etc/Tivoli/tec/facts/ACT.wic exists. If it does, then the process goes to step 910. Otherwise the process goes to step 912. Step 910 is to consult the /etc/Tivoli/tec/facts/ACT.wic file to load the act_on, act_default_server, and act_keep_days facts. Then the process continues with step 912.

The ACT.wic can contain three types of facts.

The first is to indicate the default ACT server for this TEC. It is used when processing automated window events which come from managed resources rather than an ACT server. Since the events did not come from an ACT server, we would not know which ACT server to send the confirmation to. The fact is of the form "act_default server('act_server')." where act_server is the name of the ACT server as defined in the ACT server. Case is important.

The second type of fact is used to override the number of days to keep window dump logs. The default is 60 days. The fact of the form "act_keep_days ('xxx')." where xxx is the number of days to keep logs before deleting them.

The third type of fact is only used to allow suppressing events when the resource_id slot is not used. This would be when ACT is installed in a rulebase that is not running the standard superTEC rulebase. The fact is of the form "act_on ('type')." where type is one of:

HOSTNAME—to indicate that we will do suppression based on the value in the hostname slot if there is no resource_id set in an event.

SHORT_HOSTNAME—to indicate that we will do suppression based on the first word of the value in the hostname slot.

ORIGIN—to indicate that we will do suppression based on the value in the origin slot which in general should be an ip address.

Once the file has been consulted to load the facts, we do a lookup of the facts and record act_default_server and act_on to the appropriate values. This allows us to use the recorded values in the rules rather than doing the fact lookups since fact lookups are repetitive (they search for all matches vs. first match which is slower). The act_keep_days is only needed once a day so we just use that as a fact.

Step 912 is to check if the get_short_hostname predicate exists. If not, the process goes to step 914. At this step 914, since get_short_hostname does not exist, load the gsnma_templates if they exist. If they do not, we may still function depending on the functions that are needed. At step 916, a decision is made. If the event being processed is a gsnma_control event, then it was meant just for this rule. In that case, we go to step 920. Otherwise the vent is a TEC_Start, and the process goes to step 922. At step 920, since the event was meant just for us, we drop the event and do a commit_set so no other rules will fire. Then we are done.

At step 922, since this is a TEC_Start, then we need to start the daily timer to clear the window logs after they are 60 days old. The name of the timer is ACT_Log_Clean. We just start a 24 hour timer on TEC_TIC. We need to allow the event to go through other rulesets so we just commit the rule now.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. An event suppression tool for use with an event management system for managing events received for given resources, wherein during defined times, events related to said resources are generated and sent to the event management system, and the event management system receives said events and issues actions in response to receiving said events, the event suppression tool comprising:

a database having a resource table;
a batch loader interface for creating or updating said resource table;
a web based user interface to said database;
a batch interface to receive data about planned activities and affected resources; and
code for creating suppression activity windows based on said data and said resource table, and for sending to the event management system a suppression event identifying a period of time and an associated one of the resources to prevent the event management system from issuing actions in response to receiving, during said time period, events for said one of the resources; and wherein:
the event management system records on a log events for said one of the resources and received during said time period; and
the tool retrieves the events recorded on the log.

2. The event suppression tool according to claim 1, wherein said code includes means to start and to stop each of the activity windows.

3. The event suppression tool according to claim 2, wherein the means to start and to stop includes means to start and to stop each of the suppression activity windows at regular, repeated intervals.

4. The event suppression tool according to claim 1, wherein said code includes means for establishing a start time and a stop time for each of the suppression activity windows.

5. The event suppression tool according to claim 1, wherein:
each of the suppression activity windows is open for a defined period of time; and
said code includes means for suppressing from said user interface, new events that fall within each of the suppression activity windows when each suppression activity window is open.

6. The event suppression tool according to claim 1, wherein:
a multitude of resources are identified in said resource table; and
each of the suppression activity windows is associated with a respective one of said multitude of resources.

7. A method for suppressing events and for use with an event management system for managing events received for given resources, wherein during defined times, events related to said resources are generated and sent to the event management system, and the event management system receives said events and issues actions in response to receiving said events, the method comprising the following computer-implemented steps:
providing a database having a resource table;
using a batch loader interface for creating or updating said resource table;
providing a web based user interface to said database;
using a batch interface to receive data about planned activities and affected resources; and
creating suppression activity windows based on said data and said resource table, and for sending to the event management system a suppression event identifying a period of time and an associated one of the resources to prevent the event management system from issuing actions in response to receiving, during said time period, events for said one of the resources; and wherein:
the event management system records on a log events for said one of the resources and received during said time period; and
the tool retrieves the events recorded on the log.

8. The method according to claim 7, wherein the creating step includes the step of starting and stopping each of the suppression activity windows according to predetermined rules.

9. The method according to claim 8, wherein the step of starting and stopping includes the step of starting and stopping each of the suppression activity windows at regular, repeated intervals.

10. The method according to claim 7, wherein the creating a step includes the step of establishing a start time and a stop time for each of the suppression activity windows.

11. The method according to claim 7, wherein:
each of the suppression activity windows is open for a defined period of time; and
the creating step includes the step of suppressing from said user interface, new events that fall within each of the suppression activity windows when each suppression activity window is open.

12. The method according to claim 7, wherein:
a multitude of resources are identified in said resource table; and
each of the activity windows is associated with a respective one of said multitude of resources.

13. A program storage device readable by machine, tangibly embodying a program of instructions executable by the machine to perform method steps for suppressing events and for use with an event management system for managing events received for given resources, wherein during defined times, events related to said resources are generated and sent to the event management system, and the event management system receives said events and issues actions in response to receiving said events, said method steps comprising:
accessing a database having a resource table;
enabling a batch loader interface to create or update said resource table;
enabling a web based user interface to said database;
enabling a batch interface to receive data about planned activities and affected resources; and
creating suppression activity windows from said data and said resource table, and for sending to the event management system a suppression event identifying a period of time and an associated one of the resources to prevent the event management system from issuing actions in response to receiving, during said time period, events for said one of the resources; and wherein:
the event management system records on a log events for said one of the resources and received during said time period; and
the tool retrieves the events recorded on the log.

14. The program storage device according to claim 13, wherein the creating step includes the step of starting and stopping each of the suppression activity windows according to predetermined rules.

15. The program storage device according to claim 14, wherein the step of starting and stopping includes the step of starting and stopping each of the suppression activity windows at regular, repeated intervals.

16. The program storage device according to claim 13, wherein the creating step includes the step of establishing a start time and a stop time for each of the suppression activity windows.

17. The program storage device according to claim 13, wherein:

each of the suppression activity windows is open for a defined period of time; and the creating step includes the step of suppressing from said user interface, new events that fall within each of the suppression activity windows when each suppression activity window is open.

18. The program storage device according to claim 13, wherein:

a multitude of resources are identified in said resource table; and each of the suppression activity windows is associated with a respective one of said multitude of resources.

19. The event suppression tool according to claim 1, wherein:

the event management system, in response to receiving the suppression event, sends a confirmation signed to the event suppression tool;

the suppression activity windows have a plurality of states on the event management system; and the event suppression tool maintains a record identifying the status of the suppression activity windows on the event management system.

\* \* \* \* \*

UNITED STATES PATENT AND TRADEMARK OFFICE
CERTIFICATE OF CORRECTION

| | | |
|---|---|---|
| PATENT NO. | : 7,568,027 B2 | Page 1 of 1 |
| APPLICATION NO. | : 10/890797 | |
| DATED | : July 28, 2009 | |
| INVENTOR(S) | : Kenneth M. Becker et al. | |

It is certified that error appears in the above-identified patent and that said Letters Patent is hereby corrected as shown below:

On the title page:
In the (*) section, please remove "This patent is subject to a terminal disclaimer".

Signed and Sealed this

Sixth Day of July, 2010

David J. Kappos
*Director of the United States Patent and Trademark Office*